Nov. 19, 1929.  J. J. SHICKLUNA  1,736,097
GROUNDING BOX
Filed June 17, 1926
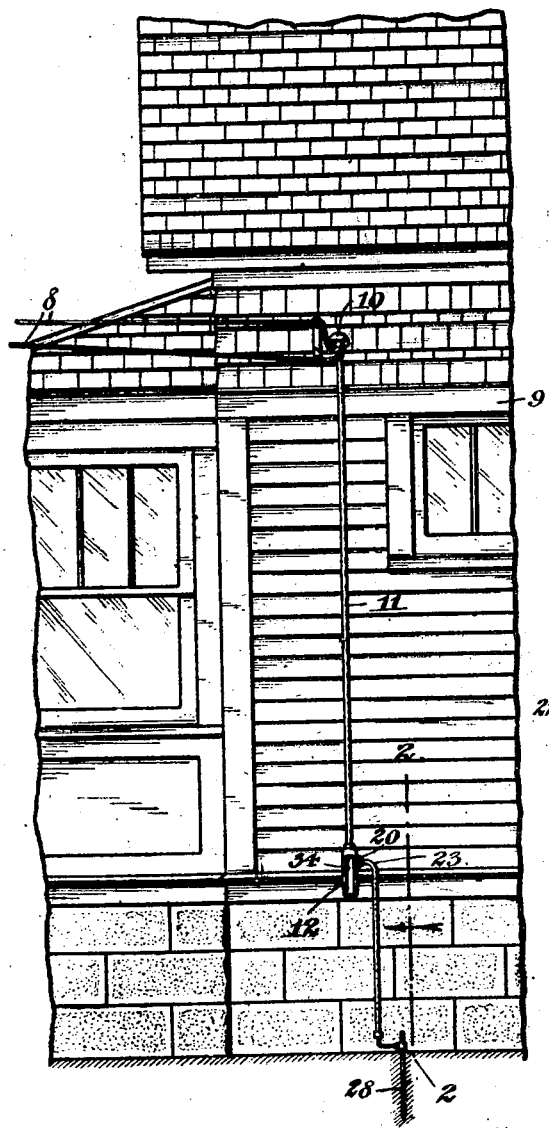
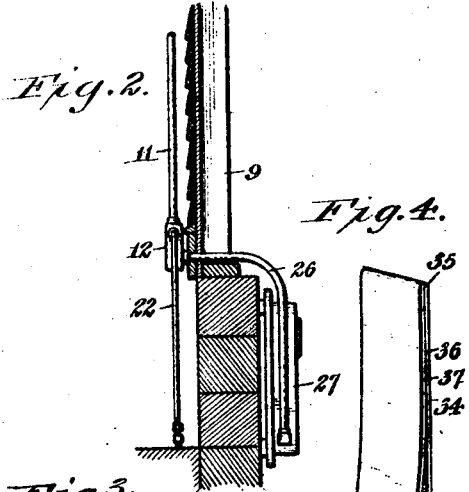
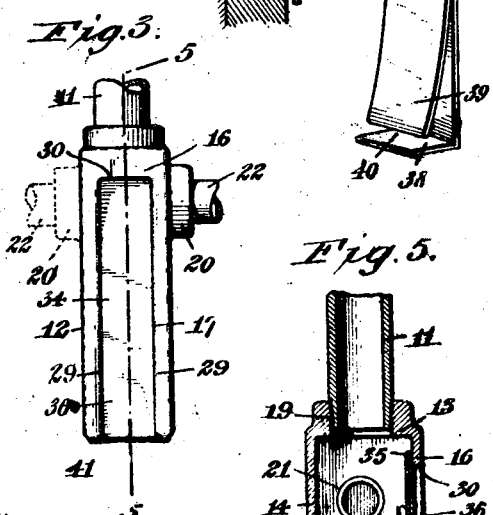
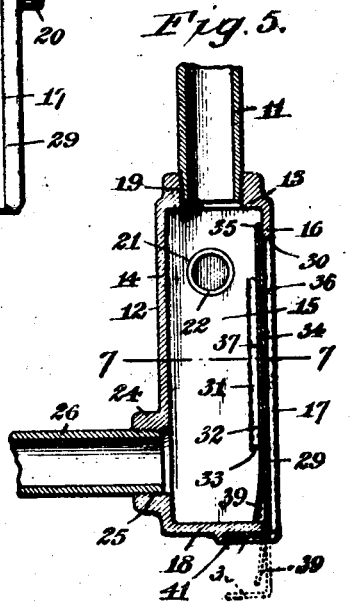
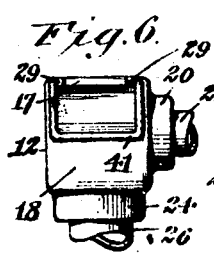
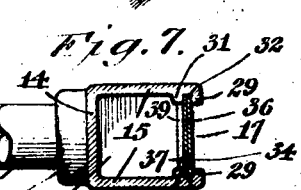
Joseph J. Shickluna, Inventor
Witness:
J. J. Oberst.

Patented Nov. 19, 1929

1,736,097

UNITED STATES PATENT OFFICE

JOSEPH J. SHICKLUNA, OF BUFFALO, NEW YORK

GROUNDING BOX

Application filed June 17, 1926. Serial No. 116,664.

My invention relates to a grounding box or condulet for electric service wires, such as are used on the exterior of buildings and form part of the conduit system enclosing the wires leading to a meter within a building.

Service wires leading from distributing lines carried along poles are invariably attached to the exterior of a building at a high point and from such point directed downwardly through conduit pipes extending along the side of the building to a low point, and thence directed inwardly to the meter located within the building. At the point where the conduit pipes are directed inwardly through the wall of the building, a wire or wires are carried downwardly for grounding purposes, and at the point of connection of the ground wire to the service wires leading into the building, the grounding box, sometimes referred to as a condulet, is provided. This box or condulet serves as a connection between the sections of the conduit pipes, and more particularly as a connection between the conduit pipe extending downwardly along the side of the building and the conduit pipe extending inwardly through the wall of the building to the meter.

Grounding boxes or condulets of this type are usually provided with a movable or detachable gate, slide, or door by means of which access can be had to the interior, but such gate, slide, or door is operable only from the interior of such box or condulet.

One of the objects of my invention is to provide a box or condulet of the kind described which is provided with a body portion having means for connection thereto of conduit pipes leading, respectively, upwardly therefrom to a high point, inwardly therefrom to a meter, and downwardly to enclose a ground wire, and having also an opening closed by a closure of new and novel construction, whereby the box or condulet may be closed and locked in an effective manner to guard against unauthorized access to the service wires leading to the meter.

Another object of my invention is to provide a closure for a grounding box or condulet which is of simple construction, inexpensive, and which serves to prevent the insertion of thin objects between the closure and portions of the box, with a view of unlocking or unlatching the closure.

Further objects will appear hereinafter, all of which tend to increase the efficiency of the box or condulet.

The invention consists in the novel features of construction and in the arrangement and combination of parts to be hereinafter described and more particularly pointed out in the subjoined claims.

In the sketch :—

Fig. 1 is a side elevation of a portion of a building, showing the conduit pipes and the grounding box or condulet applied thereto, also the wire leading from the main or distributing line to a high point of the building, from which point wires are led through the conduit pipes to the meter and to a grounding object provided for the purpose.

Fig. 2 is a substantially vertical section taken on line 2—2, Fig. 1, looking in the direction of the arrow crossing said line.

Fig. 3 is a front elevation of the grounding box or condulet showing portions of the conduit pipes attached thereto.

Fig. 4 is a detached perspective view of the slide utilized as a closure for the box or condulet.

Fig. 5 is an enlarged vertical section taken on line 5—5, Fig. 3.

Fig. 6 is a bottom plan view of the grounding box or condulet, the closure thereof being removed.

Fig. 7 is a horizontal section taken on line 7—7, Fig. 5.

Referring to the drawings in detail, the reference numeral 8 designates the lead-in and return wires which extend from a pole of a distributing line to a high point of a building designated, for example, by the numeral 9, and at such point suitable fittings 10 are provided, usually a lightning arrester and a water shedding structure into which the lead-in and return wires 8 extend and which is connected to the upper end of a conduit pipe 11 arranged vertically along the side of the building and having its lower end attached to a grounding box or condulet 12.

This box or condulet, which may also be referred to as a fitting for conduit wiring, is vertically elongated and preferably of square or other rectangular formation in cross section, and assuming its application to be as shown in the drawings, it is provided with an upper end wall 13, a rear wall 14, side walls 15 and a front wall 16 having a vertically elongated opening 17 extending from a point near its upper end downwardly to the extreme bottom of said box or condulet. Said box or condulet has also a bottom wall 18 terminating at its front end slightly in rear of a plane in which the inner surface of the front wall 16 is arranged.

The top wall 13 has a tapped opening 19 into which the lower end of the conduit pipe 11 is threaded. At one or the other side wall said box or condulet is provided with a boss 20 through which and the wall from which said boss extends a tapped opening 21 is formed and into this opening a grounding conduit pipe 22 is threaded, said pipe being preferably bent, as shown at 23, Fig. 1, and directed downwardly towards, to, or into the ground, as the case may be. The rear wall is provided with a boss 24, through which and said wall a tapped opening 25 is formed. Into this opening a conduit pipe 26 is threaded which extends through the wall of the building and is directed toward a meter 27.

The lead-in and return wires 8 are extended through the conduit pipe 11, grounding box or condulet 12 and the conduit pipe 26 in the usual manner, being completely enclosed from the fitting 10 at the outside of the building to the meter so that no unauthorized connection can be made with the service wires outside of the meter for the purpose of using unmetered current.

These lead-in and return wires, or service wires as they may be called, are arranged in any suitable manner to extend, or to have wires connected therewith extend, downwardly through the grounding conduit pipe 22 in the usual manner; and the grounding wire or wires, as the case may be, are attached to a metallic object 28 driven into the ground, or to some suitable object otherwise arranged within the ground, or extending into the ground.

The detailed description thus far given does not differ in any respect from the present mode of leading service wires into a building to a meter, but such description is believed to be desirable to more particularly set out the advantages of my invention, as will now be described.

The opening 17 formed in the front wall 16 of the grounding box or condulet is somewhat narrower than the interior of said box or condulet so that guide ribs 29 are provided along the front of the box or condulet, said ribs forming part of the front wall and extending from the extreme bottom of said box or condulet upwardly to the top 30 of said opening, and in rear of said guide ribs additional, but shorter, guide ribs 31 are provided, said guide ribs 31 being spaced from the guide ribs 29 a slight distance to provide slideways 32 between the two, which slideways may be said to be formed on the interior of the side walls along the front marginal portions thereof. By reason of the construction described, the front edge of the bottom wall 18 is spaced from the lower ends of the guide ribs 29, and the spaces so formed serve as initial guiding means for the closure, to be hereinafter described.

The two inner guide ribs 31 are illustrated as terminating at their upper ends a distance from the upper end of the opening 17; but if desired, these may be extended to a higher plane. However, it is highly essential that the lower tends terminate a distance above the bottom 18 of the grounding box or condulet, as shown at 33, Fig. 5.

34 designates the closure in the form of a slide, gate, or door constructed of a strip of resilient metal doubled upon itself near a point midway between its ends, as at 35, to provide two overlying parts 36, 37; one of said parts being longer than the other and having an angular flange 38 at its lower end. The outer part 36 of said closure is straight lined from top to bottom, while the inner part has its upper portion straight-lined and lying in contact with the inner surface of said outer part and the lower portion curved inwardly, as at 39, the lower end of said inwardly-curved portion being spaced from the angular flange 38, as at 40; said space being approximately the same as the thickness of the bottom wall 18 of said box or condulet.

The closure 34 is somewhat longer than the opening 17 formed in the front wall of the grounding box or condulet and of substantially the same width as the interior of said box or condulet, and it is adapted to be inserted upwardly into the slideways 32 by placing the upper portion thereof in contact with the front edge of the bottom wall 18 and behind the lower ends of the opposite guide ribs 29 to initially guide said closure into the guideways 32. The angular flange 38 at the lower end of this closure provides a good bearing for the hand in forcing the closure upwardly, and during its upward movement the longitudinal marginal portions of the outer surface of the closure ride in contact with the rear faces of the guide ribs 29, while the longitudinal marginal portions of the inner surface of said closure ride in contact with the front or outer faces of the guide ribs 31.

During the latter part of the upward movement of said closure, the curved portion 39 thereof is engaged by the front edge of the bottom wall 18 and forced in contact with the front part 37 of said closure until the lower edge of said curved portion clears said bottom wall, after which the inherent resiliency of said curved portion causes it to move or snap inwardly over said bottom wall and engage the same so as to lock the closure in position, thus assuring a firm locking contact of said curved portion, which may be referred to as a spring lock-tongue. The angular flange 38 is disposed so that it is normally at a slight acute angle to the front part 37 of the closure, from which it extends. Therefore, when the lower edge of the spring lock-tongue 39 is about to move or snap over the top of the bottom wall, pressure applied to the bottom of the closure will cause the angular flange 38 thereof to flex slightly and cause said spring lock-tongue to clear the bottom wall. With the angular flange 38 somewhat flexed out of its normal position, the closure will be held in place without play. Moreover, by providing the angular flange 38, which serves also as a guard, it is impossible to insert a thin tool upwardly between the front part 37 of the closure and the front edge of the bottom wall 18, with a view of straining the spring lock-tongue and moving the same forwardly out of locking contact with the bottom wall 18.

The bottom wall 18 is provided with a substantially U-shaped rib 41, which surrounds the angular flange or guard 38 of the closure, and this makes it difficult to insert a thin tool or other object underneath this guard with a view of bending the same and then gaining access to the spring lock-tongue by inserting a thin tool or other implement between the front wall of said closure and the front edge of the bottom wall 18.

When installing conduit pipes of this kind, wires are led through the pipes and suitable connection made for grounding, while the grounding box or condulet is open, and after the wires are properly grounded, the closure 34 is slid into position to close the opening of said box or condulet and automatically lock itself, in the manner described. When, for any reason it is found necessary to gain access to the grounding box or condulet, the conduit pipe 26 must be disconnected from the rear wall 14 of the box, after which the spring tongue engaged with the bottom wall 18 can be forced outwardly by inserting a suitable tool through the tapped opening 36 in said rear wall, and when said tongue is flexed into contact with the front part 37 of said closure, the latter may be drawn downwardly to open the box.

While the pipe 26 leading from the condulet 12 to the meter 27 is shown as being constructed of one piece, it may have a union or other joint in close proximity to the condulet so that upon separating the sections of this pipe, a suitable tool can be inserted through the rear of the box for the purpose of forcing the curved portion 39 of the spring lock-tongue outwardly so that its lower edge will clear the front edge of the bottom wall 18 and permit the closure 34 to be withdrawn from between the ribs 29 and 31. If, however, the re-use of this closure is not considered necessary, access may be gained to the interior of the condulet by destroying the closure and after making the desired examination or repair of the wires within the condulet, a new closure may be substituted for the one destroyed, as the cost of these closures is comparatively small. Destruction of the closure by an unauthorized person will, of course, be readily seen and any attempt to surreptitiously make connection with the service wires outside of the meter quickly detected.

While in some of the claims, reference is made to a box having front, rear, top, bottom and side walls, or some of these, these terms are merely used to distinguish one wall from another or others, and are not to be construed in a restrictive sense, since if the box were disposed horizontally, one of the side walls would serve as the top wall, and the designation of other walls of the box would likewise change. The box may be otherwise positioned with the walls changed as to location. However, the disposition of the box, as usually applied to a building, is as shown, and in such cases, the designation of the walls is definite.

While I have shown and described my invention as applied to a grounding box or condulet for electric service wires, it may be referred to as a fitting for conduit wiring, due to the fact that my invention may be applied to boxes or condulets not particularly adapted or used in connection with the service or lead-in wires leading from current distributing lines.

Having thus described my invention, what I claim is:—

1. A grounding box having an opening in its rear wall adapted to receive a conduit pipe, an elongated opening in its front wall, the portions of said front wall at opposite sides of said opening forming guide ribs, a guide rib spaced from each of said guide ribs to form a guideway and terminating at its lower end a distance from the bottom of said box, and a closure formed of a strip of metal bent upon itself to form a flat outer part and a spring lock-tongue at the inner side of said outer part, said closure, including a portion of said spring lock-tongue, being confined within said guideways and the lower portion of said tongue engaging the bottom wall of said box to prevent withdrawal of said closure.

2. A grounding box vertically elongated and comprising a rear wall, side walls, a front wall, a top wall and a bottom wall, said top wall having an opening to receive a conduit pipe and said rear wall also having an opening to receive a conduit pipe, said front wall having an elongated opening extending from a point near its upper end to the bottom of said box, the portions of said front wall at opposite sides of said opening forming guide ribs and being spaced at their lower ends from the front edge of said bottom wall, guide ribs on said side walls spaced from said first-mentioned guide ribs to form guideways terminating at their lower ends a distance from said bottom wall, and a closure formed of a strip of metal bent between its ends to form a straight outer part and an inner part having a straight upper portion lying in contact with the inner surface of said outer part and an inwardly-curved lower portion serving as a spring lock-tongue, said closure being inserted in said guideways and having the lower end of said spring lock-tongue engaged with said bottom wall.

3. A grounding box vertically elongated and rectangular in formation and having an elongated opening in its front wall extending from a point near the upper end of said box to its lower end and openings for wire conduit pipes, the portions of said front wall at opposite sides of said opening forming guide ribs spaced at their lower ends from the front edge of the bottom wall of said box, guide ribs in rear of said first-mentioned guide ribs and spaced therefrom to provide guideways, and a closure for said opening comprising a strip of metal bent between its ends to form a flat outer part and an inner part having its upper portion in contact with the inner surface of said outer part and its lower portion curved inwardly away from said outer part to form a spring-lock-tongue, said closure having an angular flange at its lower end, and being entered in said guideways and said spring lock-tongue engaging the upper surface of said bottom wall and having its angular portion extending inwardly underneath and in contact with said bottom wall.

4. A grounding box vertically elongated and of rectangular formation, said box having openings for conduit pipes and including a bottom wall and a front wall, said front wall having a vertically elongated opening therein extending from the lower end of said box upwardly and said bottom wall having a U-shaped rib on its under side, the portions of said front wall at opposite sides of said opening serving as guide ribs having their lower ends spaced from the front edge of said bottom wall, guide ribs on opposed walls of said box spaced from said first-mentioned guide ribs to form guideways therebetween and terminating with their lower ends a distance from said bottom wall, a closure for said opening formed of a strip of metal bent upon itself between its ends to form an outer straight part and an inner part whose upper portion lies in contact with the inner surface of said outer straight part and whose lower portion is curved inwardly to form a spring lock-tongue, said outer straight part having an angular flange at its lower end normally at a slight acute angle to said outer straight part, said closure having opposite longitudinal marginal portions positioned within said guideways, the lower end of said spring lock-tongue being in engagement with the upper surface of said bottom wall and said angular flange being surrounded on three sides by said U-shaped rib.

5. A grounding box having opposite side walls, a front wall provided with an elongated opening, a rear wall, top and bottom walls, and openings for conduit pipes formed in said box, a pair of spaced guide ribs on the inner surface of each side wall along its front marginal portion, the inner guide rib of each pair terminating with its lower end a distance from said bottom wall and the outer guide rib of each pair extending at least to the plane of the under side of said bottom wall and being spaced from the front edge of the latter, and a closure formed of a strip of metal transversely co-extensive with the space between said side walls and bent upon itself between its ends to form a straight outer part, an inner part having a portion flexed inwardly away from said outer part to form a spring lock-tongue, and an angular flange at the lower end of said outer part disposed at an acute angle to the latter and spaced from the lower end of said spring lock-tongue a distance approximating the thickness of said bottom wall, said closure being fitted between said guide ribs and having said spring lock-tongue in contact with the upper side of said bottom wall and said angular flange in contact with the lower side thereof.

6. A grounding box for electric wires having an opening in one of its walls and having also other openings for connection thereto of conduit pipes through which electric wires are to be passed, a closure arranged to slidably close said first-mentioned opening, and means for locking said closure when closing said opening, said means being accessible only through one of said other openings for unlocking said closure to permit its withdrawal from the box.

7. A grounding box for electric wires having a closure opening in one of its walls and having also a conduit pipe opening in another wall, a conduit pipe secured in said conduit pipe opening for the passage of electric wires therethrough, a closure closing said first-mentioned opening, and means for locking said closure in closed position, said locking means being inaccessible from the exterior of the box except through said conduit pipe opening after removal of said conduit pipe.

8. A grounding box for electric wires having an opening in one of its walls and a conduit opening for connection of a conduit pipe thereto, a closure arranged to close said first-mentioned opening, and means in the interior of the box for locking said closure, said means being accessible through said conduit opening.

9. A grounding box having a plurality of conduit openings for connection of conduit pipes thereto, said box including two walls disposed at an angle to each other, one of said walls having an elongated opening therein, guideways at opposite sides of said opening, a closure slidably fitted into said guideways and locking mechanism carried by said closure engaging the other of said angular walls when said closure is in fully closed position, said locking means being accessible only through one of said conduit openings.

10. A fitting for conduit wiring, having an opening in one of its walls permitting access to wiring in the fitting and having other openings for the connection of conduits through which wires are to be passed, and a closure for said first-mentioned opening, said closure and fitting being provided with interengaging means permitting a movement of the closure relative to the fitting to close said opening, and further including means for locking said closure in closed position, accessible only through one of said other openings for unlocking said locking means.

11. A fitting for conduit wiring having a comparatively large opening in one of its walls permitting access to wiring in the fitting and having conduit openings for connection of conduits through which wires arranged within said fitting are passed, a closure for said comparatively large opening, and locking means carried by said closure for locking the same when in position to close said comparatively large opening, said locking means being inaccessible excepting through one of said conduit openings.

In testimony whereof I affix my signature.

JOSEPH J. SHICKLUNA.